United States Patent Office

3,264,239
Patented August 2, 1966

3,264,239
VULCANIZING AGENT PREPARED FROM SULFUR, LINSEED OIL AND DICYCLOPENTADIENE
George Rosen and Warren D. Helmer, Levittown, Pa., assignors to Thiokol Chemical Corporation, Bristol, Pa., a corporation of Delaware
No Drawing. Filed Oct. 8, 1963, Ser. No. 314,635
14 Claims. (Cl. 260—23.7)

This invention relates to the vulcanization of rubber and more particularly, to a group of novel interpolymers of sulfur, linseed oil and dicyclopentadiene that are especially useful as vulcanizing agents for vulcanizing rubbers. The invention also relates to vulcanizable compositions and vulcanizates incorporating the interpolymers of the invention, as well as to methods of making the interpolymers, vulcanizable compositions and vulcanizates.

In order to produce economically the large quantities of vulcanizable rubber compositions required in the tire and rubber specialties industries, it has been found necessary to use automated methods and strict time schedules in the mixing and other operations used in preparing the vulcanizable compositions. To permit adherence to these time schedules, the component materials of the vulcanizable compositions must meet certain strict criteria in respect to speed and ease of uniform incorporation into the rubber mixes. The art of masterbatching was developed in an effort to solve these problems. In masterbatching, the components to be added to the rubber, except for the vulcanizing agent, are premixed with the rubber to form a masterbatch. The masterbatch can be stored as such or the vulcanizing agent can be immediately added to the masterbatch, and the resulting mixture can either be pressed out and stored in an uncured or undercured state for later vulcanization or immediately vulcanized by heating to an elevated temperature. The ease and rapidity with which the vulcanizing agents can be uniformly incorporated in a mixture or masterbatch are often important to the "heat history" of the vulcanizates produced therewith, in addition to importantly contributing to the economics of the mixing operations. The "heat history" of a vulcanizate is the extent to which the vulcanizate has been heated, taking into account both the temperature and time of heating.

For many years it has been customary to vulcanize both natural and synthetic rubbers by incorporating elemental sulfur therein by milling at an elevated temperature and then heating the resulting composition to vulcanizing temperatures. While elemental sulfur is an effective vulcanizing agent, its use gives rise to certain problems and disadvantages. Thus it is difficult to achieve optimum dispersion of the sulfur throughout the mass of rubber without subjecting the rubber to an undesirably large amount of heating. Also elemental sulfur tends to produce vulcanizates having a surface discoloration known in the art as "bloom" which is caused by migration of portions of the compounding ingredients to the surface of the rubber. Bloom is considered especially undesirable in unvulcanized curable rubbers, such as are used in making tires, where it appears to hinder proper lamination of the rubber to the non-rubber portions of the tire. Also in the retreading of tires, bloom apparently inhibits the proper lamination of the new tread to the tire carcass. Moreover, bloom that occurs in vulcanized end products produces unsightly surface discolorations which detract from the aesthetic appearance of the vulcanized products.

It has been suggested that these disadvantages of elemental sulfur as a rubber vulcanizing agent can be eliminated or at least mitigated by using an organic compound of sulfur instead of elemental sulfur as a vulcanizing agent. More particularly, Hendry et al. in their U.S. Patent No. 2,989,513 teach the use of certain olefin-sulfur compositions having a sulfur rank of 2 to 5 for the vulcanization of sulfur-curable rubbers. Sulfur rank as the term is ordinarily used in this art is the ratio of the number of gram atomic weights of sulfur to the number of gram molecular weights of olefinic reactant units present in the curing agent. When low-rank materials of the type disclosed in Patent No. 2,989,513 are incorporated into rubber mixes, they provide vulcanizable compositions and vulcanizates which are appreciably more resistant to curing agent bloom than similar compositions formed using elemental sulfur. However, such olefin-sulfur compounds are in general either viscous liquids or very soft solids. The solids have very low melting or softening points and are subject to extensive cold flow. At the blending temperatures commonly used in the art, these materials are mobile liquids, and hence are much more difficult to incorporate in rubber than is elemental sulfur. They cannot readily be milled into the rubber in the conventional manner. Moreover, such low-rank materials contain a relatively high proportion of organic matter which tends to exert a substantial plasticizing effect on the rubber, and hence use of these low-rank olefin-sulfur curing agents results in vulcanizates that are far softer than those produced by the equivalent amounts of elemental sulfur as the curing agent.

It is accordingly an object of the present invention to provide novel solid interpolymers of sulfur, linseed oil and dicyclopentadiene that are especially useful in the vulcanization of rubber. It is another object of the invention to provide interpolymers of this type that have a relatively high melting or softening point, i.e., a softening point at least as high as that of elemental sulfur in rhombic form. It is still another object of the invention to provide a novel class of vulcanizing agents which when incorporated in rubber produce vulcanizable compositions that have both the bloom-resistant properties of compositions prepared with the previously proposed organic sulfur compounds and the tight curing properties characteristic of compositions prepared with elemental sulfur as a vulcanizing agent. It is a further object of the invention to provide vulcanizing agents that can be more fully and uniformly incorporated in natural and synthetic rubber than can elemental sulfur or the previously proposed organic sulfur compounds. It is a still further object of the invention to provide substantially bloom-free vulcanizates that are not significantly softer than those prepared with elemental sulfur. It is a still further object of the invention to provide methods of making the novel interpolymers, vulcanizable compositions, and vulcanizates of the invention. Other objects of the invention will be in part obvious and in part pointed out hereafter.

The present invention is based on the finding that certain interpolymers of sulfur, linseed oil and dicyclopentadiene when prepared in the manner described in detail below are especially useful as vulcanizing agents in rubber. These products have a relatively high available sulfur content with the result that they can be used in relatively small amounts in the vulcanization of rubber. Moreover, since they have a low organic content and can be used in small amounts, they have a much smaller plasticizing effect upon the rubber in which they are incorporated than do the low-rank olefin-sulfur compounds referred to above. Also the products of the invention are sufficiently friable so that they can be readily reduced to a fine powder and incorporated in rubber using the standard milling techniques common in the rubber industry. Further, the present products have softening temperatures as determined by ASTM procedure E28–58T above the freezing point of natural, rhombic sulfur, which is the type of sulfur used in the vulcanizing arts. As they may be incorporated into rubber stocks at rates comparable to that of elemental sulfur, they are suitable for use in automated processes. Also these products confer greater bloom-resistance than does elemental sulfur on vulcanizable compositions in which they are incorporated.

In general, the interpolymers of the invention are made by heating a mixture of sulfur, linseed oil and dicyclopentadiene in suitable proportions to an elevated temperature to produce a product having sulfur rank within the range 20 to 100. More particularly, the quantities of sulfur and dicyclopentadiene are desirably so selected as to provide a mixture containing 20 to 100 gram atomic weights of sulfur per gram mole of dicyclopentadiene. It should be noted that sulfur rank as used in the present specification is based on the ratio of sulfur to dicyclopentadiene; the fact that linseed oil contains unsaturated bonds is disregarded. The weight ratio of dicyclopentadiene to linseed oil may vary from about 1:2 to about 3:1. Any of the common grades of linseed oil such as raw, boiled or refined linseed oil can be used. Interpolymerization of the three components can be effected at temperatures of about 125° to 135° C. over a period of five to fifty hours. The interpolymers formed in this manner upon cooling to room temperature form friable solids having a high proportion of available sulfur when used as vulcanizing agents in rubber.

Interpolymers as thus prepared can be used to vulcanize any of the rubbers known to be sulfur-vulcanizable, including natural rubber and synthetic rubber materials having aliphatic unsaturation. Commercially important rubbers of this type include natural rubber, butadiene-1,3/styrene copolymers, butadiene-1,3/acrylonitrile copolymers, polybutadienes, polyisoprenes, isobutylene/isoprene copolymers and ethylene/propylene/non-conjugated diene terpolymers. The interpolymers may be substituted for sulfur in standard vulcanizing formulations, and when used in the proportions of 1% to 60% by weight, based on the weight of the rubber, give vulcanizates having excellent tensile and elastic properties. The higher percentages of the present curing agents are usefully employed to produce hard rubber products. Smaller quantities of vulcanizing agent, i.e., 1% to 4% by weight, are desirably employed to obtain soft rubber vulcanizates having a Shore A hardness of say 40 to 70. Since the present products are friable solids, they can be readily reduced to powder form and incorporated in the rubber by the usual milling techniques.

Curing of the vulcanizable compositions is effected under conventional vulcanizing conditions, i.e., heating at temperatures of say 250° F. to 350° F. for periods of say 5 minutes to 6 hours. Since the present compounds have a high available sulfur content, they are more efficient than the liquid sulfur-olefin products of the prior art. That is to say, they can be used in smaller amounts and introduce into the vulcanizate a smaller portion of organic material which, as noted above, tends to plasticize and soften the vulcanizate. Preferred results have been obtained by using sulfur-linseed oil-dicyclopentadiene polymers having a sulfur rank of about 30 and a weight ratio of dicyclopentadiene to linseed oil of 1:1.

As is usual in the rubber compounding art, various adjuvant materials may be optionally incorporated in the present vulcanizable compositions. These adjuvants include reinforcing fillers such as carbon blacks or silicon dioxide, bulking fillers, processing and plasticizing oils and chemicals, cure activators and accelerators, and other materials which may aid in attaining particular physical properties. In general, any of the special purpose adjuvant materials known to practitioners of the rubber compounding art may be incorporated in known manner in the present vulcanizable compositions.

In accordance with the usual rubber compounding practice, the sulfur-vulcanizable rubber is mixed with adjuvant materials to form a uniform blend on a mill or in an internal mixer. The interpolymeric curing agent of the invention is added in such quantities as to provide a weight of sulfur in the composition comparable to the weight of elemental sulfur that would be used in the same recipe. Blending of the present interpolymers with the rubber occurs rapidly and uniformly to produce vulcanizable, bloom-resistant compositions having a minimal heat history. The present vulcanizing agents are well suited for use in the short mixing schedules desired in automated operations.

In order to point out more fully the nature of the present invention, the following specific examples are given of illustrative methods of making the products of the invention and typical properties of the products thus produced.

EXAMPLE 1

A reaction vessel was charged with 1067.6 grams (about 33.3 gram atoms) of molten sulfur, 149.7 grams (about 1.1 moles) of dicyclopentadiene and 149.7 grams of raw linseed oil. The contents of the reaction vessel were heated to temperatures of 128° to 130° C., stirred until uniform, and maintained at this temperature for a total of about six hours. The reaction mixture was then cooled and permitted to solidify to yield a friable interpolymer having a softening temperature in excess of 235° F. according to ASTM test method E28–58T, and a sulfur content of about 78.5% by weight. The interpolymer was pulverized prior to further use. To test the melting characteristics of the interpolymer, a quantity was placed on a hot mill at 260° F. The interpolymer softened slightly but did not flow.

The ability of this interpolymer to cure rubbers was compared with that of elemental sulfur, using a prepared unvulcanized SBR rubber mixture idenified as "Philprene 1606." This mixture contains 100 parts by weight of SBR 1502 rubber, which is a butadiene 1,3-styrene copolymer, 52 parts by weight of a high abrasion furnace carbon black (Philblack O) and 10 parts by weight of a highly aromatic plasticizing process oil formed from petroleum distillates (Philrich 5). A masterbatch was prepared by mixing on a rubber mill 162 parts of the "Philprene 1606" with 5 parts by weight of zinc oxide as a cure activator, 2 parts by weight of stearic acid and 1.3 parts by weight of N-cyclohexyl-2-benzothiazole sulfenamide (Santocure) as a cure accelerator.

A first portion of this masterbatch comprising 170.3 parts by weight containing 100 parts by weight of the unvulcanized SBR 1502 rubber was dispersed on a rubber mill and 2.25 parts by weight of the interpolymer incorporated therein. A second portion of the masterbatch comprising 170.3 parts by weight was mixed on a mill with 1.8 parts by weight of elemental sulfur. The quantities of vulcanizing agents used were those typically used in the art for producing vulcanized soft rubber. The amount of interpolymer used in the first portion of masterbatch was such that its available sulfur was substantially equivalent in weight to the weight of elemental sulfur used in the second portion of the masterbatch. The time required to incorporate the interpolymer into the masterbatch was similar to that required to incorporate the elemental sulfur therein.

The vulcanizable compositions containing the interpolymer and sulfur, respectively, were pressed out and cured in a rubber press for 30 minutes at 307° F. to provide cured slabs for testing. The physical properties of the cured slabs were as indicated in Table I below.

*Table I*

|  | Interpolymer | Sulfur |
|---|---|---|
| Ult. Tensile strength, p.s.i. | 3,670 | 3,700 |
| Ult. Elongation in percent | 620 | 590 |
| Hardness, Shore A | 60 | 64 |

It was further found that the vulcanizable compositions containing the interpolymer prepared as described above had greater bloom-resistance than similar compositions made with elemental sulfur.

EXAMPLE 2

Four interpolymers designated, respectively, 2.1, 2.2, 2.3 and 2.4 were prepared according to the method of Example 1 except as indicated herein. More particularly, reaction mixtures were used like those in Example 1 except that the quantity of dicyclopentadiene was increased to 220.1 grams and the quantity of linseed oil was reduced to 73.4 grams to yield a product having a sulfur rank of 20. The reaction temperature was 128° to 130° C. as in Example 1, but different reaction times were used as indicated in Table II below.

*Table II*

| Interpolymer | 2.1 | 2.2 | 2.3 | 2.4 |
|---|---|---|---|---|
| Reaction time, hrs | 4 | 8 | 16 | 56 |
| Softening temperature, in °F | 180 | 235+ | 235+ | 235+ |

The above table shows that the product prepared using the reaction time of only four hours had an appreciably lower softening temperature than the other three products. Upon testing the four interpolymers on a mill at 260° F., it was found that interpolymer 2.1 melted rather rapidly, whereas the other three interpolymers merely softened slightly and did not flow. Also it was found that interpolymer 2.1 required considerably more time for incorporation into a masterbatch, whereas the other three interpolymers exhibited a blending rate comparable to that of elemental sulfur.

Vulcanizates were prepared using interpolymers 2.3 and 2.4 and sulfur as curing agents and employing the masterbatch, procedure and curing conditions of Example 1. The physical properties of the resulting vulcanizates were determined as follows:

*Table III*

| Curing Agent | Sulfur | 2.3 | 2.4 |
|---|---|---|---|
| Tensile strength, p.s.i. | 3,700 | 3,500 | 2,570 |
| Elongation, in percent | 590 | 590 | 610 |
| Hardness (Shore A) | 64 | 61 | 61 |

EXAMPLE 3

Using the general procedure of Example 1, four interpolymers designated, respectively, 3.1, 3.2, 3.3 and 3.4 were prepared having different sulfur ranks and different ratios of dicyclopentadiene to linseed oil, as indicated in Table IV below.

*Table IV*

| Interpolymer | 3.1 | 3.2 | 3.3 | 3.4 |
|---|---|---|---|---|
| Sulfur, grams | 721.4 | 769.4 | 1,242.3 | 1,234 |
| Dicyclopentadiene, grams | 132.0 | 79.3 | 153.7 | 101.8 |
| Linseed oil, grams | 66.0 | 79.3 | 51.2 | 101.8 |
| Sulfur rank | 22.5 | 34.8 | 33.4 | 50 |
| Wt. ratio, diene/oil | 2:1 | 1:1 | 3:1 | 1:1 |
| Reaction temp., °C | 125 | 125 | 128–130 | 128–130 |
| Reaction time, hrs | 6.22 | 6.1 | 8 | 8 |
| Wt. percent sulfur in product | 79.2 | 82.6 | 86.9 | 86.7 |

All four products as thus prepared had softening temperatures greater than 235° F. When tested on a mill at 260° F., products 3.1, 3.2 and 3.3 softened slightly but did not run. Product 3.4 did not run, but became slightly greasy. It was found that products 3.1, 3.2 and 3.3 could be incorporated in a SBR masterbatch very rapidly, whereas product 3.4 was somewhat slower in this respect.

It is of course to be understood that the foregoing examples are intended to be illustrative only and that numerous changes can be made in the ingredients, proportions and conditions specifically disclosed therein without departing from the spirit of the invention as defined in the appended claims.

We claim:

1. A solid interpolymer of sulfur, linseed oil and dicyclopentadiene.

2. A solid interpolymer of sulfur, linseed oil and dicyclopentadiene having a sulfur rank of 20 to 100.

3. A solid interpolymer according to claim 2 and wherein the weight ratio of dicyclopentadiene to linseed oil is from about 1:2 to about 3:1.

4. A solid interpolymer according to claim 3 and wherein the ratio of dicyclopentadiene to linseed oil is about 1:1.

5. A process for making a vulcanizing agent which comprises preparing a mixture of sulfur, linseed oil and dicyclopentadiene containing from 20 to 100 atoms of sulfur per molecule of dicyclopentadiene and having a weight ratio of dicyclopentadiene to linseed oil of about 1:2 to 3:1, heating the resulting mixture at 125° to 135° C. for at least 5 hours to form an interpolymer, and cooling and comminuting the interpolymeric product.

6. A process according to claim 5 wherein the reaction mixture is maintained at a temperature of 128° to 130° C. for a period of 5 to 50 hours.

7. A bloom-resistant vulcanizable composition comprising a major proportion of a sulfur-curable rubber and 1% to 60% by weight of a curing agent based on the weight of said rubber, said curing agent being essentially composed of at least one interpolymer of sulfur, linseed oil and dicyclopentadiene.

8. A vulcanizable composition according to claim 7 wherein the curing agent has a sulfur rank of about 20 to 100 and a weight ratio of dicyclopentadiene to linseed oil of 1:2 to 3:1.

9. A vulcanizable composition according to claim 7 wherein the curing agent is present in quantities of 1% to 4% by weight of the rubber.

10. A vulcanizate which is the product of the vulcanization of the composition of claim 7.

11. A vulcanizate which is the product of the vulcanization of the composition of claim 8.

12. The method of preparing a bloom-resistant vulcanizate which comprises mixing a sulfur-curable rubber with 1% to 60% by weight of said rubber of a curing agent essentially composed of at least one interpolymer of sulfur, linseed oil and dicyclopentadiene having a sulfur rank of 20 to 100 and curing the resulting mixture at 250° to 350° F.

13. The method of preparing a bloom-resistant vulcanizate which comprises mixing with a sulfur-curable butadiene-1,3 styrene copolymer from 1% to 4% by weight of said rubber of a curing agent essentially composed of an interpolymer of sulfur, linseed oil and dicyclopentadiene having a sulfur rank of 20 to 100 and a weight ratio of dicyclopentadiene to linseed oil of 1:2 to 3:1, and heating the resulting mixture to 250° to 350° F. to cure it.

14. A vulcanizate prepared by the method of claim 13.

References Cited by the Examiner

UNITED STATES PATENTS

| | | | |
|---|---|---|---|
| 2,399,694 | 5/1946 | Rostler et al. | 260—775 |
| 2,450,384 | 9/1948 | Roberts | 260—339 |
| 2,475,664 | 7/1949 | Gerhart | 260—23.7 |
| 2,806,843 | 9/1957 | Welch | 260—79 |
| 2,989,513 | 6/1961 | Hendry et al. | 260—775 |

LEON J. BERCOVITZ, *Primary Examiner.*

R. A. WHITE, *Assistant Examiner.*